D. C. RIPLEY.
FORMING JOINTS IN GLASSWARE.

No. 177,425. Patented May 16, 1876.

Witnesses.
James D. Kay
R. Q. Wrenshall

Inventor.
Daniel C. Ripley
by Bakewell & Kerr
Attys

UNITED STATES PATENT OFFICE.

DANIEL C. RIPLEY, OF PITTSBURG, PENNSYLVANIA.

IMPROVEMENT IN FORMING JOINTS IN GLASSWARE.

Specification forming part of Letters Patent No. 177,425, dated May 16, 1876; application filed March 25, 1876.

*To all whom it may concern:*

Be it known that I, DANIEL C. RIPLEY, of Pittsburg, in the county of Allegheny and State of Pennsylvania, have invented a new and useful Improvement in Method of Forming Joints of Glassware; and I do hereby declare the following to be a full, clear, and exact description thereof, reference being had to the accompanying drawing, forming a part of this specification, in which—

Figure 1:
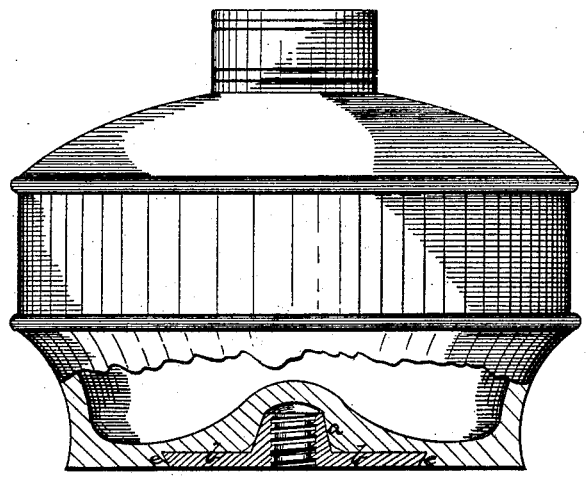
Figure 2:
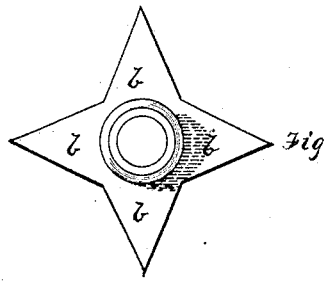
Figure 3:

Figure 1 is a view, partly in section, of a lamp bowl or fount, illustrating my invention; and Fig. 2 is a plan view of a nut having the characteristics which fit it for the purposes of my invention. Fig. 3 is an edge view of the same.

Like letters refer to like parts wherever they occur.

My invention relates to the manner of connecting two or more portions of a glass article, such as a lamp bowl and pedestal, a salver and foot, or an article of glass with one of metal, as a bracket and lamp-bowl; and it consists in embedding a piece of metal within the glass at the time the article is formed, or, in other words, forming the glass upon and around a piece of metal of such a shape as will neither interfere with the shrinking of the glass or be loosened thereby.

Heretofore several methods have been adopted for uniting the parts of a glass article, as, for instance, the well-known manner of sticking the parts by means of a "bit," and also by means of sockets and pegs formed in and on the several parts which were subsequently cemented together. This latter method has likewise been employed for securing glass bowls to metallic pedestals.

The objections to the foregoing methods are the increased cost and labor of manufacture, and the insecurity of the joints formed.

In a patent granted to me May 26, 1874, and numbered 151,435, is described a method for attaching handles or socket-pieces to glassware, consisting in inclosing a portion of the glass article within the metal band; but such a method, though effective, and productive of a secure joint, necessitates the exposure of the metal, which, in many instances, interferes with the finish, and is otherwise objectionable.

The present invention, in so far as the glass incloses the metal, may be said to be the reverse of the former method.

I will now proceed to describe my invention, so that others skilled in the art to which it appertains may apply the same.

It is a well-known fact that glass, in cooling, shrinks from surface to center, or, in other words, contracts, so that, for instance, in pressing glass, if the article is allowed to chill in the mold and around the plunger, the article, though more readily removed from the mold, cannot be readily detached from the plunger. With these facts in view, I shape the metal to be embedded in the glass so that it shall taper from center to circumference, so that as the glass shrinks or contracts it shall ride down the bevels, or pass from a thicker to a thinner portion of the metallic piece.

In the drawing, Figs. 2 and 3 represent a metallic nut or socket piece, having the characteristics indicated; a tapering collar, $a$, and radiating points $b\ b$, beveled, as at $c$, in a direction the reverse of the taper of the collar $a$, so that all the lines recede from the center of the metal piece.

Having provided a metallic piece with the features indicated, it is placed in the mold and secured in the desired position, after which the glass is blown, pressed, or otherwise formed upon or around it. When the article is removed from the mold, that portion of the glass which surrounds the metal will shrink or contract in lines radiating from the center of the metal, and, as all boundary-lines of the metallic article are beveled, or recede from said center, there will be nothing to obstruct the contraction of the glass. If the metal is properly beveled, the glass will set or chill before it has contracted sufficiently to free the metal.

I do not herein limit myself to the form shown, for various forms having the characteristics specified as essential may be readily devised. Neither do I confine myself to tapping the metal to make a joint, for the reason that a projecting peg may be used, and various ways devised for making the joint after the metal has been embedded and secured in the glass.

Having thus described my invention, what I claim, and desire to secure by Letters Patent, is—

1. The method herein described for attaching portions of glassware and metal, the same consisting in embedding a metallic socket-piece, having the characteristics specified, within the glass article at the time of forming the article.

2. A metallic socket-piece having beveled edges, the lines of which recede from the center of the piece, substantially as and for the purpose specified.

In testimony whereof I, the said DANIEL C. RIPLEY, have hereunto set my hand.

DANIEL C. RIPLEY.

Witnesses:
JAMES I. KAY,
F. W. RITTER, Jr.